United States Patent
Feuerborn et al.

(10) Patent No.: US 6,942,928 B2
(45) Date of Patent: Sep. 13, 2005

(54) POWER TRANSMISSION BELT

(75) Inventors: Frank Joseph Feuerborn, Lincoln, NE (US); Darren Blaine Moncrief, Lincoln, NE (US)

(73) Assignee: The Goodyear Tire & Rubber Company, Akron, OH (US)

( * ) Notice: Subject to any disclaimer, the term of this patent is extended or adjusted under 35 U.S.C. 154(b) by 27 days.

(21) Appl. No.: 10/383,080

(22) Filed: Mar. 6, 2003

(65) Prior Publication Data

US 2003/0176539 A1 Sep. 18, 2003

Related U.S. Application Data

(60) Provisional application No. 60/364,205, filed on Mar. 14, 2002.

(51) Int. Cl.[7] .............................. B32B 25/02

(52) U.S. Cl. ................ 428/492; 399/165; 399/162

(58) Field of Search .................. 428/492, 493, 428/423.1; 399/162, 165; 524/703, 849

(56) References Cited

U.S. PATENT DOCUMENTS

| | | | |
|---|---|---|---|
| 2,603,668 A | 7/1952 | Houwink et al. | 260/750 |
| 3,203,913 A | 8/1965 | Finelli | 260/9 |
| 3,888,810 A | 6/1975 | Shinomura | |
| 4,002,791 A | 1/1977 | Sawyer | 428/260 |
| 4,127,039 A * | 11/1978 | Hollaway, Jr. | 474/263 |
| 4,203,876 A | 5/1980 | Dereppe et al. | 260/17.4 |
| 4,737,532 A | 4/1988 | Fujita et al. | 524/13 |
| 5,246,985 A | 9/1993 | Saito et al. | 524/13 |
| 5,405,299 A * | 4/1995 | Kubo et al. | 474/205 |
| 6,793,599 B2 * | 9/2004 | Patterson et al. | 474/260 |

* cited by examiner

Primary Examiner—Thao T. Tran

(57) ABSTRACT

An endless power transmission belt having
(1) a tension section;
(2) a cushion section; and
(3) a load-carrying section disposed between said tension section and cushion section; and the belt containing an elastomeric composition comprising
  (a) 100 parts by weight of a rubber; and
  (b) from about 1 to about 175 parts by weight of wood flour.

14 Claims, 1 Drawing Sheet

POWER TRANSMISSION BELT

This application claims the benefit of provisional application No. 60/364,205 filed on Mar. 14, 2002.

BACKGROUND OF THE INVENTION

Recent developments in the automotive industry have resulted in higher engine output in a more compact engine compartment. As a result, power transmission belts on these engines have been required to operate under higher load, at high tensions and at high temperatures. This environment demands a high quality belt capable of withstanding these severe conditions along with consumer demand for longer lasting belts. The belts must also perform under variable wet/dry conditions. Therefore, there exists a need for new and improved belts to quench the demand in the industry.

SUMMARY OF THE INVENTION

The present invention relates to a power transmission belt that is characterized by a rubber composition containing wood flour.

BRIEF DESCRIPTION OF THE FIGURES

The accompanying figures show embodiments of this invention in which.

DETAILED DESCRIPTION OF THE INVENTION

There is disclosed an endless power transmission belt having (1) a tension section;

(2) a cushion section; and (3) a load-carrying section disposed between said tension section and cushion section; and the belt containing an elastomeric composition comprising (a) 100 parts by weight of a rubber; and (b) from about 1 to about 175 parts by weight of wood flour.

It is to be understood that reference herein to "parts" "parts by weight" and "phr" means "parts by weight per hundred parts by weight of rubber".

The present invention relates to a new and improved power transmission belt.

The power transmission belt of the present invention may be embodied in accordance with the three conventional-type of designs of power transmission belt. In the first design, the cushion section is fabric-faced, ground short fiber-reinforced cushion section or molded gum with short fiber flocked faced cushion section. In the second design, the cushion section has a cut edge or fabric jacketless belt which has plies of rubber-coated fabric or plies of fiber reinforced stock as the base material. The third design is a textile jacketed belt which is wrapped with one or more jackets of textile fabric.

Figure 1:
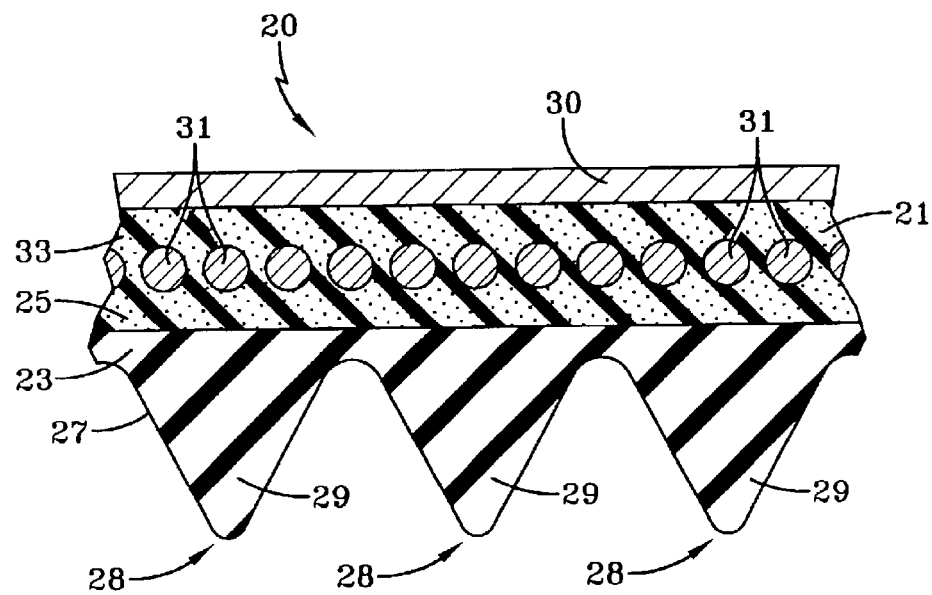
FIG. 1 is a fragmentary perspective view illustrating one embodiment of an endless power transmission belt of this invention.

Reference is now made to FIG. 1 of the drawing which illustrates an endless power transmission belt structure or belt of this invention which is designated generally by the reference numeral 20. The belt 20 is particularly adapted to be used in associated sheaves in accordance with techniques known in the art. The belt is particularly suited for use in short center drives, exercise equipment, automotive drives, farm equipment, so-called torque sensing drives, application where shock loads of varying belt tension are imposed on the belt, applications where the belt is operated at variable speeds, applications where the belt is spring-loaded to control its tension, and the like.

The belt 20 comprises a tension section 21, a cushion section 23 and a load-carrying section 25 disposed between the tension section 21 and cushion section 23. The belt 20 may optionally have an inside ply or inner fabric layer 27, adhered to the drive surface 28 of the ribs 29. The belt 20 of FIG. 1 has a fabric backing 30. The fabric backing 30 may be bidirectional, non-woven, woven or knitted fabric. The fabric backing layer 30 may be frictioned, dipped, spread, coated or laminated.

In accordance with the belt of FIG. 1, the fabric facing layer 27 may be made from a bi-directional, non-woven, woven or knitted fabric. The preferred fabric layer 27 is non-woven.

The fabrics to be used on the facing layer 27 may be made of conventional materials including nylon (such as nylon 4,6, nylon 6,6 and nylon 6), polyester/rayon, cotton, cotton/rayon, polyester, cotton/polyester, nylon/polyester, cotton/nylon, Lycra™ (segmented polyurethane), aramid, rayon, and the like. Preferably, the fabric is made of polyester/rayon.

The load-carrying section 25 has load-carrying means in the form of load-carrying cords 31 or filaments which are embedded in an elastomeric matrix 33 in accordance with techniques which are well known in the art. The cords 31 or filaments may be made of any suitable material known and used in the art. Representative examples of such materials include aramids, fiberglass, nylon, polyester, cotton, steel, carbon fiber and polybenzoxazole.

The drive surface 28 of the belt 20 of FIG. 1 is multi-V-grooved. In accordance with other embodiments, it is contemplated herein the belts of the present invention also include those belts where the drive surface of the belt may be flat, single V-grooved and synchronous. Representative examples of synchronous include belts having trapezoidal or curvilinear teeth. The tooth design may have a helical offset tooth design such as shown in U.S. Pat. Nos. 5,209,705 and 5,421,789.

The belt 20 of FIG. 1 has one drive surface 28. However, it is contemplated herein that the belt may have two drive surfaces (not shown) such as in a double-sided belt. In such an instance, one or both drive surfaces may be with fabric as described herein. Preferably, the belt 20 has one drive surface.

The elastomeric compositions for use in the tension section 21 and cushion section 23, and load-carrying section 25, may be the same or different.

Figure 2:
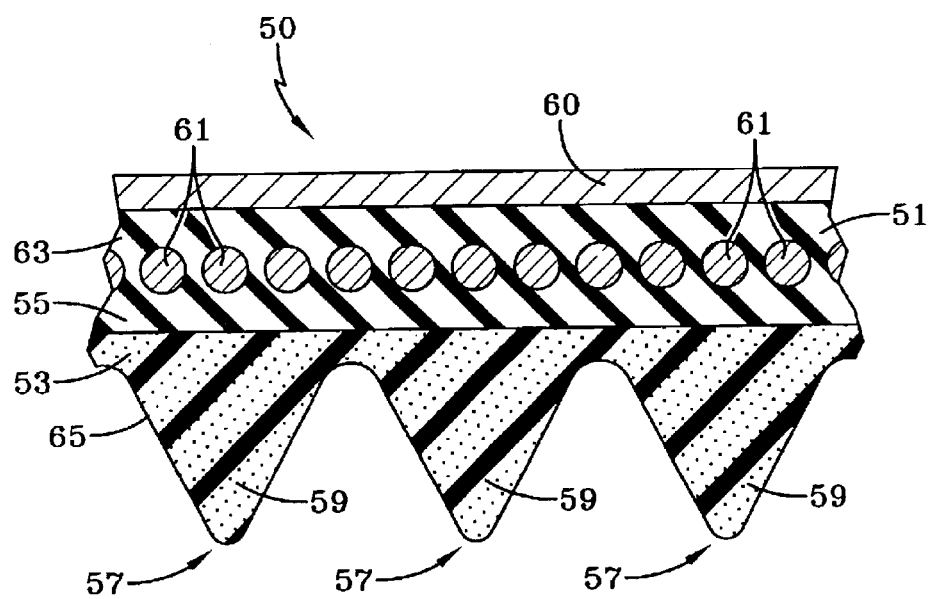
FIG. 2 is a fragmentary perspective view illustrating one embodiment of an endless power transmission belt of this invention.

Referring to FIG. 2, there is shown an endless power transmission belt 50 according to another embodiment. Similar to the belt 20 of FIG. 1, the belt 50 comprises a tension section 51, a cushion section 53 and a load-carrying section 55 disposed between the tension section 51 and cushion section 53. Unlike the belt 20 of FIG. 1, the belt 50 of FIG. 2 does not have a fabric layer on the drive surface 57. The belt 50 of FIG. 1 does have a plurality of ribs 59 or Vs and a fabric-backing 60. The load-carrying section 55 has load-carrying means in the form of load-carrying cords 61 or filaments which are embedded in an elastomeric matrix 63. The elastomeric compound located in the cushion section 53 is illustrated as being fiber loaded 65.

The elastomeric composition for use in the tension section and/or cushion section and/or load-carrying section contains 100 parts of a rubber. Such rubber may be selected from the group consisting of ethylene alpha olefin rubber, silicone rubber, polychloroprene, polybutadiene, epichlorohydrin, acrylonitrile rubber, hydrogenated acrylonitrile rubber, zinc salts of unsaturated carboxylic acid ester grafted hydrogenated nitrile butadiene elastomer, natural rubber, synthetic cis-1,4-polyisoprene, styrene-butadiene rubber, ethylene-vinyl-acetate copolymer, ethylene methacrylate copolymers and terpolymers, chlorinated polyethylene, chlorosulfonated polyethylene, alkylated chlorosulfonated polyethylene, trans-polyoctenamer, polyacrylic rubber, non-acrylated cis-1,4-polybutadiene, polyurethanes, and mixtures thereof. The preferred rubbers are EPDM, hydrogenated acrylonitrile rubber, natural rubber, polybutadiene and styrene-butadiene rubber.

The ethylene-alpha-olefin elastomer includes copolymers composed of ethylene and propylene units (EPM), ethylene and butene units, ethylene and pentene units or ethylene and octene units (EOM) and terpolymers composed of ethylene and propylene units and an unsaturated component (EPDM), ethylene and butene units and an unsaturated component, ethylene and pentene units and an unsaturated component, ethylene and octene units and an unsaturated component, as well as mixtures thereof. As the unsaturated component of the terpolymer, any appropriate non-conjugated diene may be used, including, for example, 1,4-hexadiene, dicyclopentadiene or ethylidenenorbornene (ENB). The ethylene-alpha-olefin elastomer preferred in the present invention contains from about 35 percent by weight to about 90 percent by weight of the ethylene unit, from about 65 percent by weight to about 5 percent by weight of the propylene or octene unit and 0 to 10 percent by weight of the unsaturated component. In a more preferred embodiment, the ethylene-alpha-olefin elastomer contains from about 50 percent to about 70 percent by weight of the ethylene unit and, in a most preferred embodiment, the ethylene-alpha-olefin elastomer contains from about 55 percent to about 65 percent of the ethylene unit. The most preferred ethylene-alpha-olefin elastomer is EPDM.

The elastomeric composition also contains from about 1 to about 175 parts by weight of wood flour. Preferably, the wood flour content is from about 50 to about 125 parts by weight, and more preferably from about 55 to about 85 parts by weight. Suitable wood flour has a average particle size in a range of from about 40 mesh to 200 mesh (U.S. Standard Sieve). Suitable wood flour is available from American Wood Fibers. Various wood flours are suitable, including flours made from pine, oak, ash, and other trees.

While reference is made herein to one embodiment comprising wood flour, the invention is not so limited. Any powdered cellulosic materials or cellulose powders having the general suitable characteristics of wood flour with regard to particle size are suitable. Such powdered cellulosic materials or cellulose powders include but are not limited to powders or flours made from plant chaffs, plant stems, or other suitable components of switch blade grass, rice chaffs, hemp fiber, sisal, wheat chaffs, flax, coca nut husks, other nut husks, and other grass or plant fibers.

In accordance with a preferred embodiment, the rubber composition containing a rubber and wood flour is used in the cushion section of the belt.

Conventional carbon blacks may also be present in the composition. Such carbon blacks are used in conventional amounts ranging from 1 to 30 phr. Representative examples of carbon blacks which may be used include those known by their ASTM designations N110, N121, N242, N293, N299, S315, N326, N330, M332, N339, N343, N347, N351, N358, N375, N550, N582, N630, N624, N650, N660, N754, N762, N907, N908, N990 and N991.

A conventional acid acceptor may be present in the mixture of rubber and wood flour. Acid acceptors are known to improve the heat resistance of the rubber. Representative acid acceptors include pentaerythritol, magnesium oxide, litharge (PbO), red lead ($Pb_3O_4$), dythal (dibasic lead phthalate), trimal (tribasic lead maleate), epoxy resins, epoxidized oils, calcium hydroxide ($Ca(OH)_2$), calcium aluminate hexahydrate, magnesium hydratalate, a magnesium oxide-aluminum oxide solid solution and mixtures thereof. The magnesium oxide-aluminum oxide solid solution is generally represented by $Mg_{0.7}A_{10.3}O_{1.15}$. Representative of suitable magnesium oxide-aluminum oxide solid solutions are KW-2000 and KW-2100, both commercially available from Kyowa Kagaku Kogyo Co, Ltd, and the like. If used, the amount of the acid acceptor that is utilized ranges from about 1 to about 50 phr, preferably about 2 to about 20 phr.

It is readily understood by those having skill in the art that the rubber composition would be compounded by methods generally known in the rubber compounding art, such as mixing the various constituent rubbers with various commonly used additive materials such as, for example, curing aids and processing additives, such as oils, resins including tackifying resins and plasticizers, fillers, pigments, fatty acid, waxes, antioxidants and antiozonants. The additives mentioned above are selected and commonly used in conventional amounts. Typical amounts of tackifier resins, if used, comprise about 0.5 to about 10 phr, usually about 1 to about 5 phr. Typical amounts of processing aids comprise about 1 to about 50 phr. Such processing aids can include, for example, polyethylene glycol, naphthenic and/or paraffinic processing oils. Typical amounts of antioxidants comprise about 1 to about 5 phr. A representative antioxidant is trimethyl-dihydroquinoline. Typical amounts of fatty acids, if used, which can include stearic acid comprise about 0.5 to about 3 phr. Typical amounts of waxes comprise about 1 to about 5 phr. Often microcrystalline and carnauba waxes are used. Typical amounts of plasticizer, if used, comprise from 1 to 100 phr. Representative examples of such plasticizers include dioctyl sebacate, chlorinated paraffins, and the like.

Various non-carbon black fillers and/or reinforcing agents may be added to increase the strength and integrity of the rubber composition for making the power transmission belt of the present invention. An example of a reinforcing agent is silica. Silica may be used in the present composition in amounts from about zero to 80 parts, and preferably about 10 to 20 parts, by weight based on 100 parts of rubber.

The elastomer composition may also have other fibers or flock distributed throughout. This is particularly the case, as shown in FIG. 2, when the elastomer is used in the cushion section of the belt. The fibers or flock to be distributed throughout the elastomer mix may be any suitable material and is preferably non-metallic fibers such as cotton or fibers made of a suitable synthetic material including kevlar, nylon, polyester, PTFE, fiberglass, and the like. Each fiber may have a diameter ranging between 0.001 inch to 0.050 inch (0.025 mm to 1.3 mm) and length ranging between 0.001 inch to 0.5 inch (0.025 mm to 12.5 mm). The fibers may be used in an amount ranging from 1 to 50 phr. Preferably, the fibers may be present in an amount ranging from 1 to 20 phr.

In addition to the above, solid inorganic lubricants may be present in the mixture of ethylene alpha olefin elastomer and polybutadiene adduct. Representative examples of such lubricants include molybdenum disulfide, PTFE, molybdenum diselenide, graphite, antimony trioxide, tungsten disulfide, talc, mica, tungsten diselenide and mixtures thereof. The amount of such solid inorganic lubricants, if used, will generally range from 1 to 25 phr.

The rubber composition containing wood flour may be cross-linked by sulfur, UV cure or peroxide cure system. Well-known classes of peroxides that may be used include diacyl peroxides, peroxyesters, dialkyl peroxides and peroxyketals. Specific examples include dicumyl peroxide, n-butyl-4,4-di(t-butylperoxy) valerate, 1,1-di(t-butylperoxy)-3,3,5-trimethylcyclohexane, 1,1-di(t-butylperoxy) cyclohexane, 1,1-di(t-amylperoxy) cyclohexane, ethyl-3,3-di(t-butylperoxy) butyrate, ethyl-3,3-di(t-amylperoxy) butyrate, 2,5-dimethyl-2,5-di(t-butylperoxy) hexane, t-butyl cumyl peroxide, α,α'-bis(t-butylperoxy)diisopropylbenzene, di-t-butyl peroxide, 2,5-dimethyl-2,5-di(t-butylperoxy) hexyne-3, t-butyl perbenzoate, 4-methyl-4-t-butylperoxy-2-pentanone and mixtures thereof. The preferred peroxide is α,α'-bis(t-butylperoxy) diisopropylbenzene. Typical amounts of peroxide ranges from 1 to 12 phr (based on active parts of peroxide). Preferably, the amount of peroxide ranges from 2 to 6 phr.

A coagent is present during the free radical crosslinking reaction. Coagents are monofunctional and polyfunctional unsaturated organic compounds which are used in conjunction with the free radical initiators to achieve improved vulcanization properties. Representative examples include organic acrylates, organic methacrylates, divinyl esters, divinyl benzene, bis-maleimides, triallylcyanurates, polyalkyl ethers and esters, metal salts of an alpha-beta unsaturated organic acid and mixtures thereof.

The coagent may be present in a range of levels. Generally speaking, the coagent is present in an amount ranging from 0.1 to 40 phr. Preferably, the coagent is present in an amount ranging from 2 to 15 phr.

As mentioned above, one class of coagents are acrylates and methacrylates. Representative examples of such coagents include di-, tri-, tetra- and penta-functional acrylates, di-, tri-, tetra- and penta-functional methacrylates and mixtures thereof. Specific examples of such coagents include 1,3-butylene glycol diacrylate, 1,3-butylene glycol dimethacrylate, 1,4-butanediol diacrylate, 1,4-butanediol dimethacrylate, 1,6 hexanediol diacrylate, 1,6 hexanediol dimethacrylate, 2-henoxyethyl acrylate, alkoxylated diacrylate, alkoxylated nonyl phenol acrylate, allyl methacrylate, caprolactone acrylate, cyclohexane dimethanol diacrylate, cyclohexane dimethanol, methacrylate diethylene glycol diacrylate, diethylene glycol dimethacrylate, dipentaerythritol pentaacrylate, dipropylene glycol diacrylate, di-trimethylolpropane tetraacrylate, ethoxylated trimethylolpropane triacrylate, ethoxylated bisphenol A dimethacrylate, ethoxylated nonylphenol acrylate, ethoxylated tetrabromo bisphenol A diacrylate, ethoxylated bisphenol A diacrylate, ethoxylated bisphenol dimethacrylate, ethoxylated trimethylolpropane triacrylate, ethoxylated bisphenol A diacrylate, ethylene glycol dimethacrylate, glycidyl methacrylate, highly propoxylated glyceryl triacrylate, isobornyl acrylate, isobornyl methacrylate, isodecyl acrylate, isodecyl methacrylate, isooctyl acrylate, lauryl acrylate, methoxy polyethylene glycol monomethacrylate, methoxy polyethylene glycol monomethacrylate, neopentyl glycol diacrylate, neopentyl glycol dimethacrylate, octyldecyl acrylate, pentaacrylate ester, pentaerythritol tetraacrylate, pentaerythritol triacrylate, polyethylene glycol diacrylate, polyethylene glycol dimethacrylate, propoxylated glyceryl triacrylate, propoxylated neopentyl glycol diacrylate, propoxylated allyl methacrylate, propoxylated glyceryl triacrylate, propoxylated trimethylolpropane triacrylate, propoxylated trimethylolpropane triacrylate, stearyl acrylate, stearyl methacrylate, tetraethylene glycol diacrylate, tetraethylene glycol dimethacrylate, tetrahydrofurfuryl acrylate, tetrahydrofurfuryl methacrylate, tridecyl acrylate, tridecyl methacrylate, triethylene glycol diacrylate, triethylene glycol dimethacrylate, trifunctional acrylate ester, trifunctional methacrylate ester, trimethylolpropane triacrylate, trimethylolpropane triacrylate, trimethylolpropane trimethacrylate, tripropylene glycol diacrylate, tripropylene glycol diacrylate, tris (2-hydroxy ethyl) isocyanurate triacrylate, tris (2-hydroxy ethyl) isocyanurate triacrylate, and tris (2-hydroxy ethyl) isocyanurate trimethacrylate.

The metal salts of α,β-unsaturated organic acids include the metal salts of acids including acrylic, methacrylic, maleic, fumaric, ethacrylic, vinyl-acrylic, itaconic, methyl itaconic, aconitic, methyl aconitic, crotonic, alpha-methylcrotonic, cinnamic and 2,4-dihydroxy cinnamic acids. The metals may be zinc, cadmium, calcium, magnesium, sodium or aluminum. Zinc diacylate and zinc dimethacrylate are preferred.

The elastomeric composition may be cured with a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. The amount of sulfur vulcanizing agent will vary depending on the remaining ingredients and the particular type of sulfur vulcanizing agent that is used. Generally speaking, the amount of sulfur vulcanizing agent ranges from about 0.1 to about 8 phr with a range of from about 1.0 to about 3 being preferred.

Accelerators may be used to control the time and/or temperature required for vulcanization. As known to those skilled in the art, a single accelerator may be used which is present in amounts ranging from about 0.2 to about 3.0 phr. In the alternative, combinations of two or more accelerators may be used which consist of a primary accelerator which is generally used in a larger amount (0.3 to about 3.0 phr), and a secondary accelerator which is generally used in smaller amounts (0.05 to about 1.50 phr) in order to activate and improve the properties of the rubber stock. Combinations of these accelerators have been known to produce synergistic effects on the final properties and are somewhat better than those produced by use of either accelerator alone. Delayed action accelerators also are known to be used which are not affected by normal processing temperatures and produce satisfactory cures at ordinary vulcanization temperatures. Suitable types of accelerators include amines, disulfides, guanidines, thioureas, thiazoles, thiurams, sulfenamides, dithiocarbamates and the xanthates. Examples of specific compounds which are suitable include zinc diethyldithiocarbamate, 4,4'-dithiodimorpholine, N,N-di-methyl-S-tert-butylsulfenyldithiocarbamate, tetramethylthiuram disulfide, 2,2'-dibenzothiazyl disulfide, butyraldehydeaniline mercaptobenzothiazole, N-oxydiethylene-2-benzothiazolesulfenamide. Preferably, the accelerator is a sulfenamide.

A class of compounding materials known as scorch retarders are commonly used. Phthalic anhydride, salicylic acid, sodium acetate and N-cyclohexyl thiophthalimide are known retarders. Retarders are generally used in an amount ranging from about 0.1 to 0.5 phr.

The mixing of the rubber composition can be accomplished by methods known to those having skill in the rubber mixing art. For example, the ingredients may be mixed in one stage but are typically mixed in at least two stages, namely at least one non-productive stage followed by a productive mix stage. The final curatives including vulcanizing agents are typically mixed in the final stage which is conventionally called the "productive" mix stage in which the mixing typically occurs at a temperature, or ultimate temperature, lower than the mix temperature(s) than the preceding non-productive mix stage(s).

Curing of the rubber composition for use in the belt is generally carried out at conventional temperatures ranging from about 160° C. to 190° C. Preferably, the curing is conducted at temperatures ranging from about 170° C. to 180° C.

As known to those skilled in the art, power transmission belts may be built on a drum device. First, the backing is applied to drum as a sheet. Next, any tension section is applied as a sheet followed by spiralling onto the drum the cord or tensile members (load-carrying section). Thereafter, the cushion section is applied followed by the fabric, if any. The assembled laminate or slab is then cured and cut into the belts in a manner known to those skilled in the art.

The invention is further illustrated by the following nonlimiting examples.

EXAMPLE I

Samples were prepared of a standard peroxide cured EPDM belt compound containing varying amounts of wood flour and cotton as indicated in Table 1.

TABLE 1

| | Sample Compositions | | | | | |
|---|---|---|---|---|---|---|
| Sample No. | 1 | 2 | 3 | 4 | 5 | 6 |
| Wood Flour, phr | 100 | 100 | 100 | 0 | 0 | 50 |
| Wood size, mesh | 60 | 100 | 140 | 0 | 0 | 60 |
| Cotton, phr | 0 | 0 | 0 | 26 | 0 | 13 |

EXAMPLE II

Cured specimens made using the samples of Example I were tested for coefficient of friction in wet and dry conditions following SAE J2432. Results are shown in Table 2.

TABLE 2

| | Coefficient of Friction | |
|---|---|---|
| Sample | Dry | Wet |
| 1 | 1.076 | 0.764 |
| 2 | 1.098 | 0.786 |
| 3 | 1.220 | 0.8332 |
| 4 | 1.589 | 0.793 |
| 5 | 2.677 | 0.562 |
| 6 | 1.273 | 0.795 |

As is evident from the data in Table 2, samples 1, 2, and 3 containing wood flour showed dry coefficients of friction lower than that for sample 4 containing only cotton or sample 5 containing no cotton or wood flour. This result is highly surprising and unexpected. Uses for power transmission belts in automotive applications often require a dry coefficient of friction of less than 2. In some applications, a dry coefficient of friction of less than 1.5 is required. Each of the samples containing wood flour show dry coefficients of friction less than 1.5. Replacement of half of the cotton with 50 parts of wood flour resulted in a surprisingly substantial improvement in coefficient of friction for sample 6 as compared with sample 4.

As is further evident from the data in Table 2, samples 1, 2, and 3 containing wood flour showed wet coefficients of friction higher than those for sample 4 containing only cotton or sample 5 containing no cotton or wood flour. This result is also highly surprising and unexpected. Uses for power transmission belts in automotive applications often require a wet coefficient of friction of greater than 0.35. In some applications, a wet coefficient of friction of greater than 0.7 is required. Each of the samples containing wood flour showed wet coefficients of friction greater than 0.7.

While present exemplary embodiments of this invention and methods of practicing the same have been illustrated and described, it will be recognized that this invention may be otherwise variously embodied and practiced within the scope of the following claims.

What is claimed is:

1. An endless power transmission belt having
    (1) a tension section;
    (2) a cushion section; and
    (3) a load-carrying section disposed between said tension section and cushion section; and said belt comprising an elastomeric composition comprising
        (a) 100 parts by weight of a rubber; and
        (b) from about 50 to 125 parts by weight, per 100 parts by weight of rubber, of wood flour having an average particle size in a range of from about 40 mesh to about 200 mesh:
    wherein said belt has a dry coefficient of friction of less than 2 and a wet coefficient of friction of greater than 0.35, as measured by SAE J2432.

2. The endless power transmission belt of claim 1 wherein said elastomeric composition comprises from about 55 to about 85 parts by weight, per 100 parts by weight of rubber, of wood flour.

3. The endless power transmission belt of claim 1 wherein said belt has a dry coefficient of friction of less than 1.5.

4. The endless power transmission belt of claim 1 wherein said belt has a wet coefficient of friction of greater than 0.7.

5. The endless power transmission belt of claim 1 wherein said elastomer composition is in the cushion section of the belt.

6. The endless power transmission belt of claim 1 wherein said elastomer composition is in the load-carrying section of the belt.

7. The endless power transmission belt of claim 1 wherein said elastomer composition is in the tension section of the belt.

8. The endless power transmission belt of claim 1 wherein said composition further comprises from about 1 to about 50 parts by weight, per 100 parts by weight of rubber, of cotton powder.

9. The endless power transmission belt of claim 1 wherein said composition further comprises from about 1 to about 30 parts by weight, per 100 parts by weight of rubber, of cotton powder.

10. The endless power transmission belt of claim 1 wherein said rubber is selected from the group consisting of ethylene alpha olefin rubber, silicone rubber, polychloroprene, polybutadiene, epichlorohydrin, acryloni trile rubber, hydrogenated acrylonitrile rubber, zinc salts of unsaturated carboxylic acid ester grafted hydrogenated nitrile butadiene elastomer, natural rubber, synthetic cis-1,4-polyisoprene, styrene-butadiene rubber, ethylene-vinyl-acetate copolymer, ethylene methacrylate copolymers and terpolymers, chlorinated polyethylene, chlorosulfonated polyethylene, alkylated chlorosulfonated polyethylene, trans-polyoctenamer, polyacrylic rubber, non-acrylated cis-1,4-polybutadiene, polyurethanes, and mixtures thereof.

11. The endless power transmission belt of claim 1, wherein said rubber comprises EPDM.

12. The endless power transmission belt of claim 1, wherein said elastomeric composition is sulfur cured, peroxide cured, or UV-cured.

13. The power transmission belt of claim 1 having one or two driving surfaces.

14. The power transmission belt of claim 1 wherein the drive surface of the belt is selected from the group consisting of flat, single V-grooved, multi-V-grooved and synchronous.

* * * * *